G. H. HAHM.
GLASS FLATTENING APPARATUS.
APPLICATION FILED APR. 15, 1919.

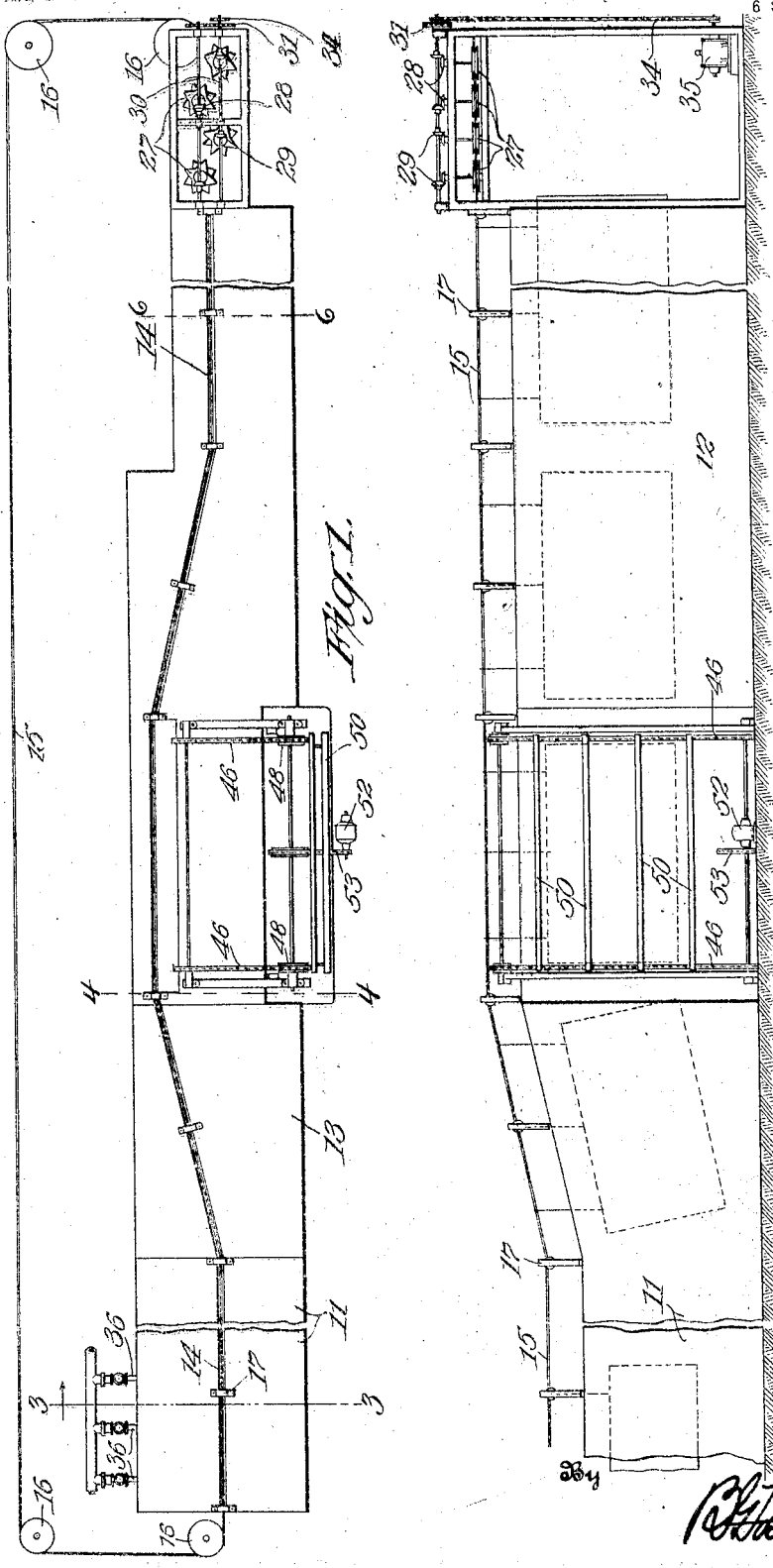

1,331,916.

Patented Feb. 24, 1920
6 SHEETS—SHEET 2.

Inventor
G. H. Hahm.

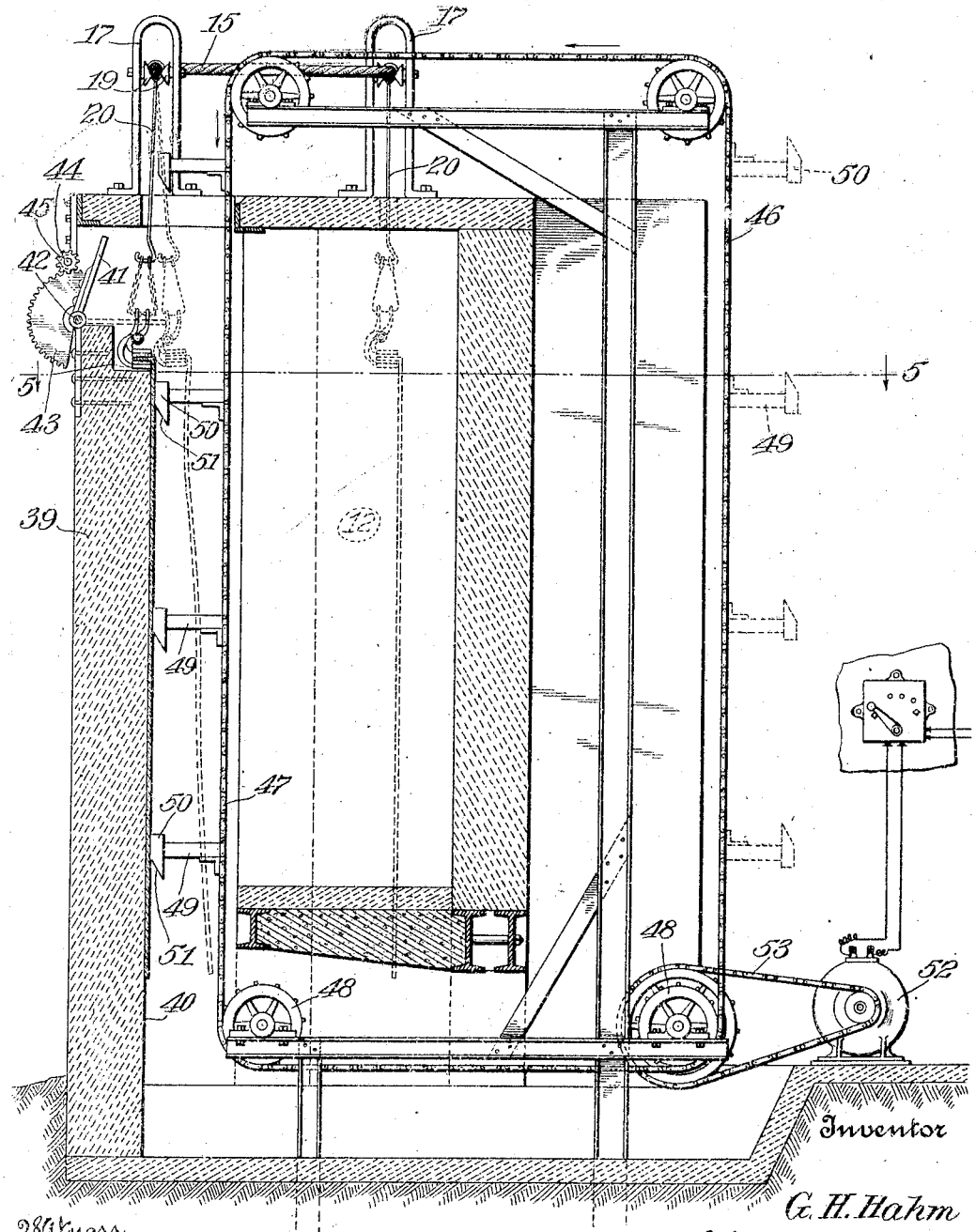

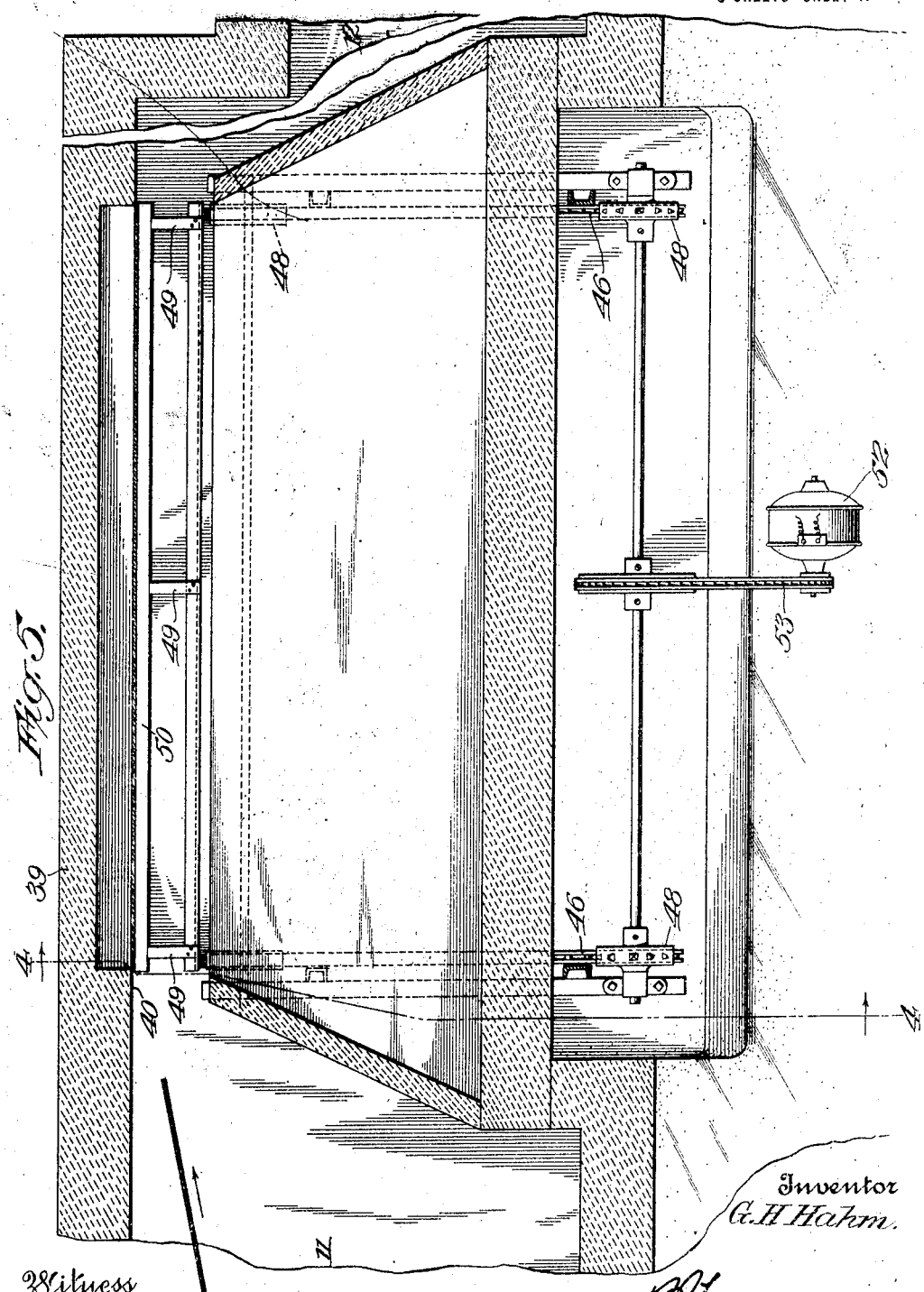

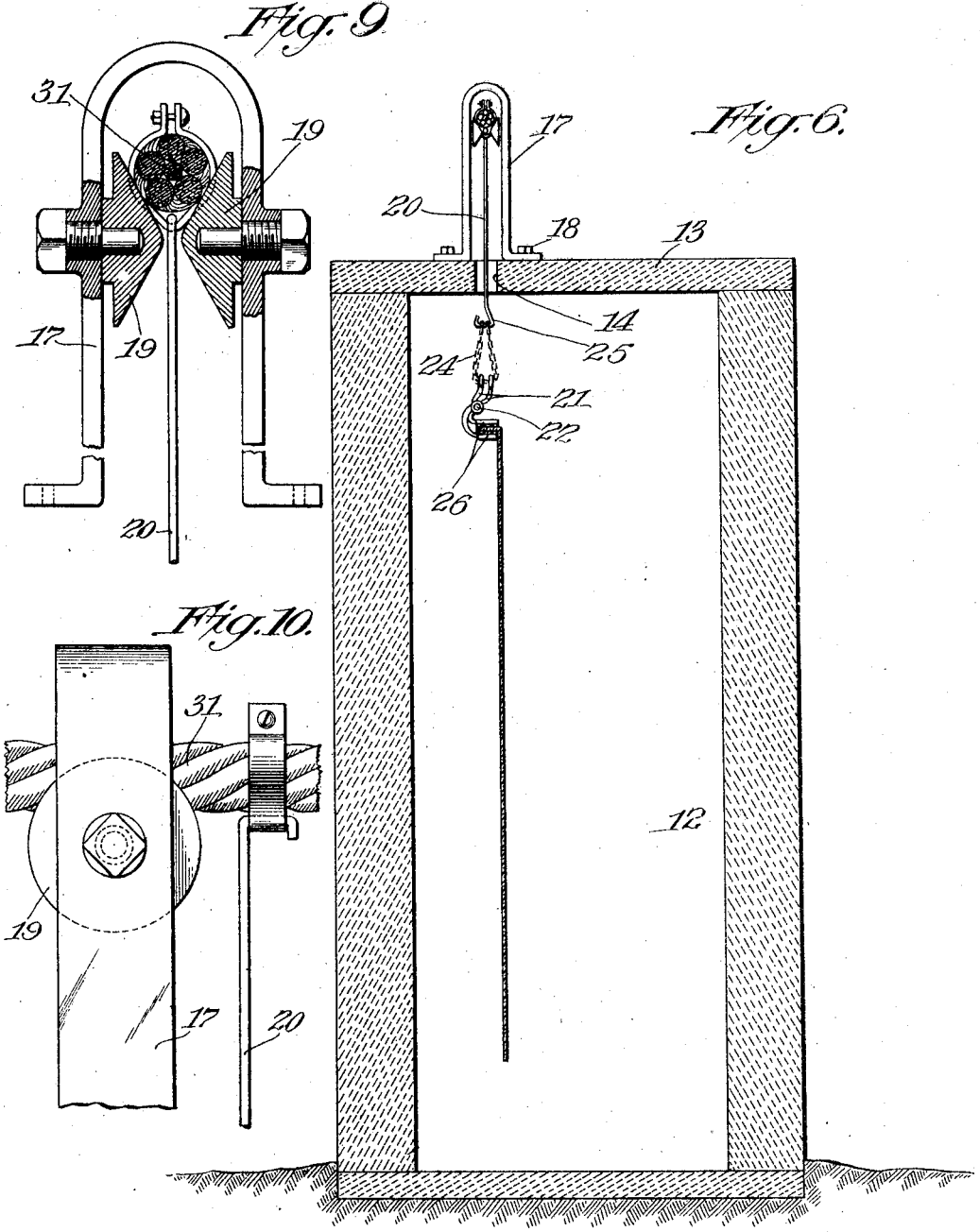

G. H. HAHM.
GLASS FLATTENING APPARATUS.
APPLICATION FILED APR. 15, 1919.
1,331,916.
Patented Feb. 24, 1920.
6 SHEETS—SHEET 6.
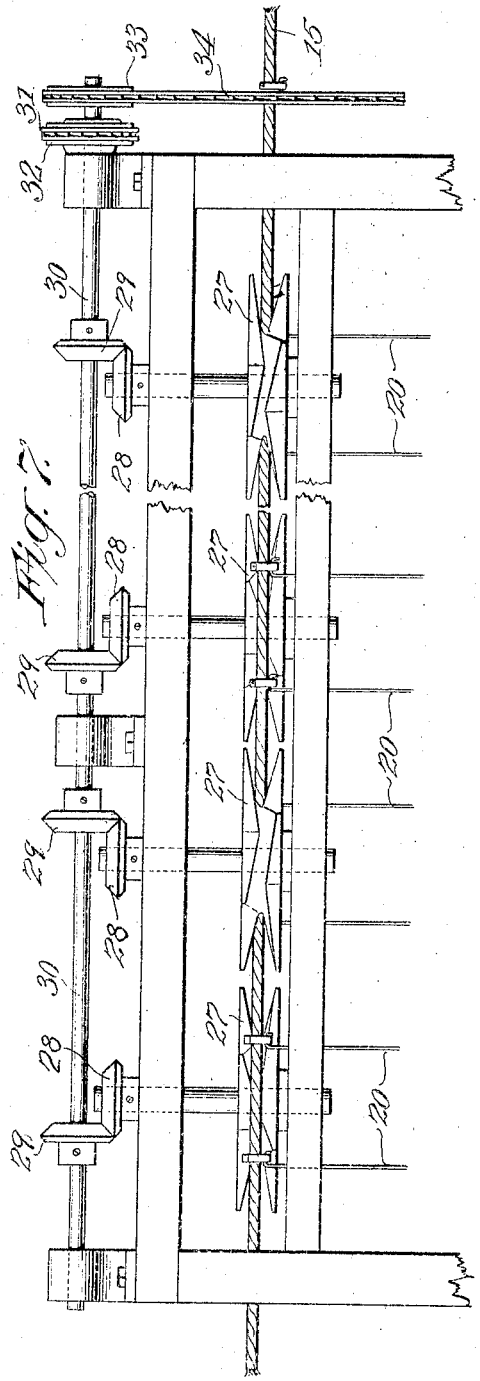
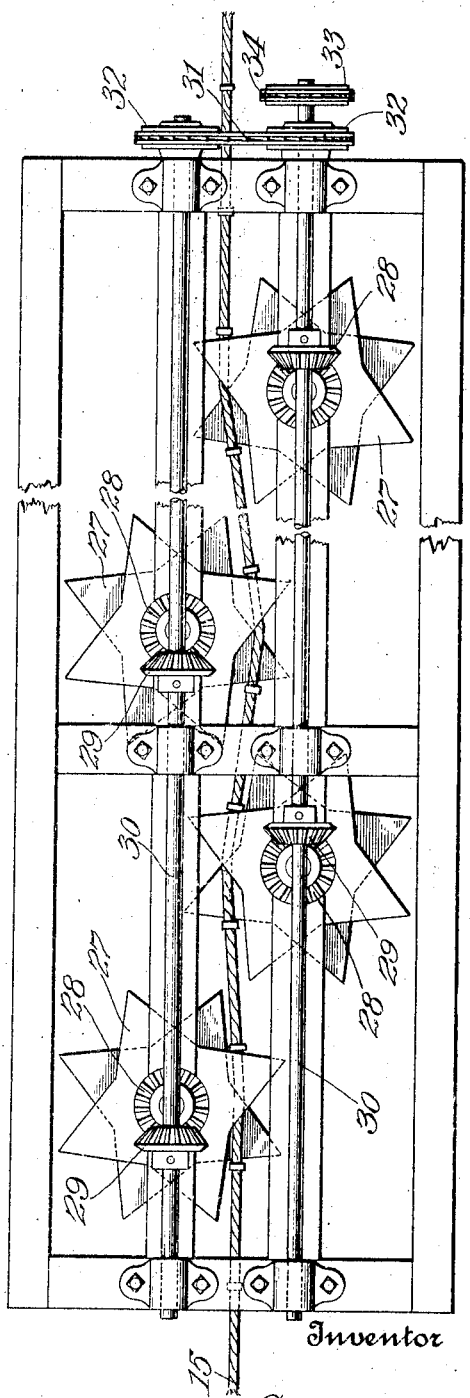

UNITED STATES PATENT OFFICE.

GEORGE H. HAHM, OF KANE, PENNSYLVANIA.

GLASS-FLATTENING APPARATUS.

1,331,916.  Specification of Letters Patent.  Patented Feb. 24, 1920.

Application filed April 15, 1919. Serial No. 290,213.

*To all whom it may concern:*

Be it known that I, GEORGE H. HAHM, a citizen of the United States, residing at Kane, in the county of McKean and State of Pennsylvania, have invented certain new and useful Improvements in Glass-Flattening Apparatus, of which the following is a specification.

The object of the present invention is to provide apparatus for effectively flattening sheets of glass in quick succession, the means for accomplishing this result at the same time being relatively simple.

In the accompanying drawings:—

Figure 1 is a plan view of the preferred embodiment of the invention, the end portions of the apparatus being broken away.

Fig. 2 is a side elevation of the same.

Fig. 4 is a similar view on the line 4—4 of Fig. 1.

Fig. 5 is a horizontal sectional view on the line 5—5 of Fig. 4.

Fig. 6 is a detail sectional view on the line 6—6 of Fig. 1.

Fig. 7 is a view in side elevation of the cable driving means on an enlarged scale.

Fig. 8 is a plan view of the same.

Fig. 9 is a detail sectional view through one of the cable supports, and

Fig. 10 is a view in elevation at right angles to Fig. 9.

Similar reference numerals designate corresponding parts in all the figures of the drawings.

Figure 3:
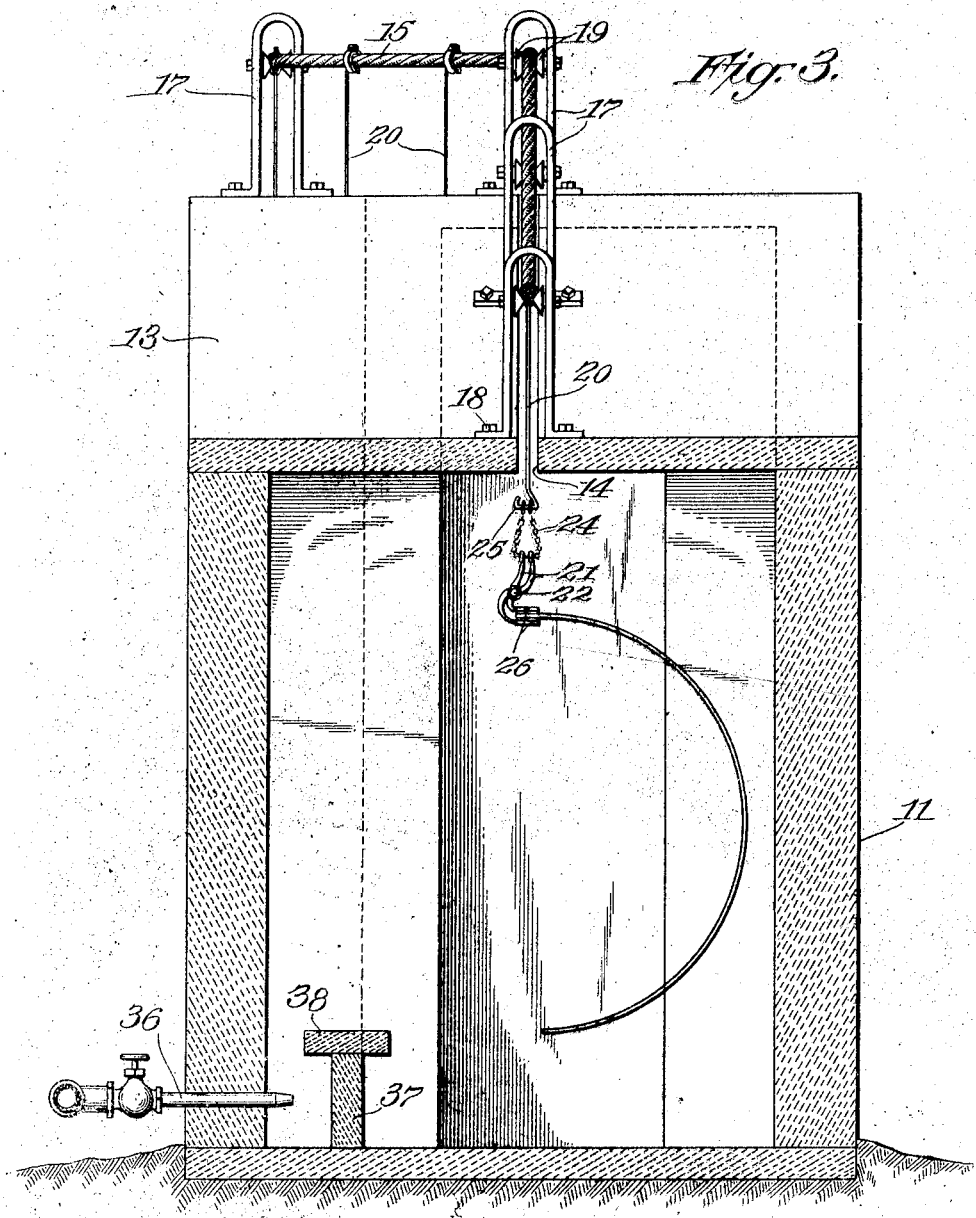
Fig. 3 is a cross sectional view on the line 3—3 of Fig. 1.

In the embodiment disclosed, an elongated chamber structure is employed, one end portion 11 constituting a heating chamber, the other end portion 12 being a cooling chamber. It will be noted by reference to Fig. 2 that the cooling chamber 12 is of greater height than the heating chamber 11. These chambers are made of suitable refractory or heat-insulating material, and the top wall 13 is provided with a longitudinal slot 14 throughout its length.

Over this said slot is supported one leg or stretch of an endless cable 15 that passes around suitable sheaves 16. The supporting means for the cable preferably consists of a series of arched standards 17 mounted, as shown, at 18 on the top 13 and bridging the slot 14. Each of the standards carries a set of oppositely disposed cone-shaped rollers 19, on which rests the said cable, as clearly illustrated in detail is Fig. 9.

Carried by the said cable is a series of hanger rods 20 that extend downwardly through the slot 14 and are provided with glass sheet gripping devices. Thus as illustrated these devices each consists of a pair of arms 21 pivotally connected between their ends as shown at 22, the upper ends having eyes 23 through which is passed a chain 24 that is engaged with the hooked lower end 25 of the hanger rod 20. The lower ends of the arms 21 are formed with substantially horizontal gripping jaws 26.

The cable is driven by any suitable means. Thus, as shown in detail in Figs. 7 and 8 there is preferably provided a series of horizontally disposed toothed wheels 27 having beveled gears 28 that are in mesh with beveled pinions 29 carried by shafts 30 journaled above these wheels. The shafts 30 are connected by a sprocket chain 31 passing around sprocket wheels 32 on said shafts, and one of the shafts furthermore has a sprocket wheel 33 engaged by a sprocket chain 34. The latter chain may be driven by any suitable source, as for example, a motor 35.

For the purpose of heating the chamber 11, a plurality of burners 36 extend into the lower portion of the same, these burners being of any desired or well known form, and located within the chamber in the path of the flames from said burners, is a baffle comprising a longitudinal wall 37 with a transverse cap 38 placed thereupon.

At the juncture between the chambers 11 and 12 is placed flattening apparatus, which is preferably constructed as follows: An upright flattening slab 39 is employed, the inner face 40 of which constitutes the flattening surface, and the sheets of glass are brought alongside the same by the cable, but during their movement are held in spaced relation to such surface by a guard or guide in the form of a plate 41 pivotally mounted at the top of the slab, as shown at 42. This plate is adapted to be swung from a horizontal to a substantially vertical position by any suitable means. For example, the said plate may have a gear segment 43 engaged by a pinion 44 carried by an operating shaft 45, the said shaft being actuated by any suitable means, not shown. When the plate 41 is in its horizontal position the sheet gripping devices will ride against the inner edge of the same, and thus hold the sheets away from the flattening surface. When, however, the plate is swung upwardly the sheet will then be brought directly against the face 40.

Endless cable members, preferably in the form of sprocket chains 46 have vertical stretches 47 disposed adjacent to the flattening surface, these cables or chains 46 passing around suitable sprocket wheels 48, and mounted on said chains or cables are standards 49 carrying flattening bars 50 preferably of wood and having their advanced edges beveled as shown at 51. The cables or chains are driven by any suitable means, as for example, a motor 52 geared as shown at 53 to one set of the sprocket wheels 48.

The operation of the apparatus may be briefly described as follows. Preferably the glass introduced is in the form of "shawls"; namely, each consists of one half of the usual glass cylinder. These are engaged in the jaws 26 of a plurality of the grips and are carried successively into the heating chamber. Here they are gradually heated until they reach a temperature that will cause them to straighten out by gravity due to their suspended condition. Each sheet is then brought opposite to the flattening surface 40, whereupon the guard 41 is swung upwardly and the sheet thus moves to a position against the said surface. Thereupon the motor 52 is thrown into operation and the bars 50 operating against the said sheet will flatten the same against the surface. When properly flattened the guard 41 is again moved downwardly and the cable once more thrown into operation, carrying the finished sheet into the cooling chamber and bringing another sheet into position to be acted upon. Thus, it will be seen that the sheets are quickly and successively heated, flattened and cooled.

From the foregoing, it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In apparatus of the character set forth, the combination with heating means, of means for simultaneously suspending a plurality of glass sheets and carrying them in suspended position successively through the heating means, and mechanism for flattening the sheets while heated and in suspended position.

2. In apparatus of the character set forth, the combination with a heating chamber, of means for heating the same, mechanism for flattening said sheets while so suspended, and means for simultaneously carrying a plurality of suspended glass sheets and maintaining certain of the same in the heating chamber while the flattening mechanism is operating on one of said suspended sheets.

3. In apparatus of the character set forth, the combination with an elongated heating chamber, of movable means located above the same for suspending therein a plurality of sheets of glass, and means operating in the chamber for flattening one of such sheets while so suspended and while the others are being heated.

4. In apparatus of the character set forth, the combination with an elongated heating chamber adapted to simultaneously hold a plurality of sheets of glass, of an endless cable located over the same, means for moving the cable, hangers carried by the cable for simultaneously carrying a plurality of suspended sheets of glass in the chamber, and mechanism past which the sheets of glass are carried by the cable for flattening such suspended sheets of glass successively.

5. In apparatus of the character set forth, the combination with an elongated chamber having a top provided with a longitudinal slot, of an endless cable operating over the top, means for moving the cable, hangers carried by the cable and depending through the slot, gripping devices carried by the hangers within the chamber for suspending glass sheets therefrom, means operating on the suspended sheets for flattening the same, and means for heating the glass sheets progressively prior to their association with the flattening apparatus and as they are advanced toward the same.

6. In apparatus of the character set forth, the combination with a substantially upright flattening apparatus, of means for simultaneously conveying a plurality of glass sheets toward and from the same and effecting their heating during their movement toward said flattening apparatus, and means for operating the flattening apparatus when a sheet is in operative position with respect thereto.

7. In apparatus of the character set forth, the combination with an upright flattening surface, of means for locating glass sheets thereagainst, and means movable against such sheets to flatten the same.

8. In apparatus of the character set forth, the combination with an upright flattening surface, of means for locating glass sheets thereagainst, a flattening device, and means for moving the same over the glass sheets when against the surface.

9. In apparatus of the character set forth, the combination with an upright flattening surface, of means for locating glass sheets thereagainst, a plurality of flattening devices, and means for moving the same successively over the glass sheets when against the surface.

10. In apparatus of the character set forth, the combination with an upright flattening surface, of means for locating glass sheets thereagainst, endless cable members operating adjacent to the surface, and flattening bars carried by the cables and moved thereby against the glass sheet when placed against the surface.

11. In apparatus of the character set forth, the combination with a substantially upright flattening surface, of means for carrying suspended glass sheets alongside the same, and means for flattening the suspended glass sheets against such surface.

12. In apparatus of the character set forth, the combination with a substantially upright flattening surface, of means for carrying suspended glass sheets alongside the same in spaced relation thereto, means for securing the lateral movement of such sheets to a position against the surface and means movable over the sheets for flattening the suspended glass sheets against such surface.

13. In apparatus of the character set forth, the combination with a substantially upright flattening surface, of a carrying device for moving suspended sheets to a position alongside the surface in spaced relation thereto, a guard for normally holding the sheets in such spaced relation, said guard being movable to a position to permit the sheets being placed against the surface, and flattening means that operate over the sheets when against the surface to flatten the sheets against said surface.

14. In apparatus of the character set forth, the combination with an elongated heating chamber, of a cooling chamber of greater height communicating therewith, means for transporting glass sheets in suspended position through the chambers, and means at the juncture of the two chambers for flattening said sheets.

15. In apparatus of the character set forth, the combination with an elongated heating chamber, of means for carrying sheets in suspended relation through said chamber, burners for injecting heating flames into the lower portion of said chamber, a baffle interposed between the burners and the sheets carried through the chamber, a cooling chamber communicating with the heating chamber, and means for flattening the glass located at the juncture of the two chambers.

16. In apparatus of the character set forth, the combination with an elongated chamber, one end portion of which is of greater height than the other end portion, said chamber being provided with a longitudinal slot, of a cable operating over the chamber, hangers carried by the cable and extending through the slot, glass sheet gripping devices mounted in the lower ends of the hangers for carrying glass sheets through the chamber in suspended position, means for moving the cable, means for projecting heating flames into the smaller end portion of the chamber, an upright flattening slab located substantially at the juncture of the chambers, means for normally maintaining the sheets in spaced relation to said slab, said means being movable to permit the sheets to engage the slab, endless cables operating adjacent to the slab, and flattening bars carried by said cable and coöperating with said slab to flatten the sheets thereagainst.

17. In apparatus of the character set forth, the combination with means for flattening sheets while in suspended relation, of means for advancing a plurality of suspended sheets simultaneously to the flattening means, and mechanism for progressively heating the sheets during such advancement and prior to their association with the flattening means.

In testimony whereof I affix my signature in the presence of two witnesses.

GEORGE H. HAHM.

Witnesses:
D. V. CROSSMIRE,
PEARLE JONES.